(12) United States Patent
Lawrence (10) Patent No.: US 7,097,307 B2
(45) Date of Patent: Aug. 29, 2006

(54) SYSTEMS AND METHODS FOR DISPLAYING SIMULATED IMAGES

(76) Inventor: Susannah Lawrence, 1909 Beacon St., Apartment 1R, Brookline, MA (US) 02445

( * ) Notice: Subject to any disclaimer, the term of this patent is extended or adjusted under 35 U.S.C. 154(b) by 153 days.

(21) Appl. No.: 10/818,669

(22) Filed: Apr. 6, 2004

(65) Prior Publication Data
US 2005/0219465 A1 Oct. 6, 2005

(51) Int. Cl.
G03B 21/26 (2006.01)
G03B 21/32 (2006.01)
G03B 31/06 (2006.01)
E04H 3/10 (2006.01)
A63G 31/16 (2006.01)

(52) U.S. Cl. .............. 353/28; 353/10; 353/15; 353/19; 353/94; 353/121; 52/6; 52/7; 472/60; 472/61; 352/40; 352/69; 352/88; 352/89

(58) Field of Classification Search .......... 353/10, 353/15, 19, 28, 94, 121; 52/6, 7; 472/60, 472/61; 358/60; 352/40, 69, 88, 89
See application file for complete search history.

(56) References Cited

U.S. PATENT DOCUMENTS

| 4,962,420 A | * | 10/1990 | Judenich ................. 348/744 |
| 6,407,798 B1 | * | 6/2002 | Graves et al. ............ 352/69 |
| 6,665,985 B1 | * | 12/2003 | Hennes ..................... 52/7 |

* cited by examiner

*Primary Examiner*—Melissa Jan Koval (57) ABSTRACT

The invention provides systems and methods for generating a visual image that is made to appear to be situated behind an architectural structure, such as a wall of a building, and is viewed through windows thereof. The image appears as an oversize object relative to the actual object. The system and method include an image recorder and/or a pre-recorded image, an image display apparatus, and a mask. Upon being projected, the image of interest is masked so that illumination falls on one or more regions of a display surface, and no illumination reaches the architectural structure outside the display region(s). Sound can be provided as required to complete the illusion. The image can be a still image or a moving image. In some embodiments, two viewers can see the image from opposite sides of the structure, each perceiving the image as being on the side opposite to the viewer.

21 Claims, 8 Drawing Sheets

SYSTEMS AND METHODS FOR DISPLAYING SIMULATED IMAGES

FIELD OF THE INVENTION

The invention relates to the display of visual images in general and particularly to systems and methods that employ architectural structures as a portion of a display surface.

BACKGROUND OF THE INVENTION

Many methods are known for displaying images by casting illumination on a surface. For example, slide projectors for displaying presentations are well known. In the field of holography, images are projected that appear to exist independent of physical surfaces. However, there is not presently available a technique wherein an image is produced that appears to a viewer to be present on an opposite side of a structure from the viewer, for example, an image that appears to be on the opposite side of a wall having windows therein.

There is a need for systems and methods that can simulate the presence of an image that appears to be on an opposite side of a structure from a viewer thereof.

SUMMARY OF THE INVENTION

In one aspect, the invention relates to a method of generating a visual display. The method comprises the steps of utilizing as a display surface a region of an architectural structure, the region being visible to a viewer, the viewer being situated on a first side of the architectural structure; and projecting at least a portion of an image on the display surface, the at least a portion of the image representing a portion of a magnified image relative to an actual size of a subject of the image. The at least a portion of the image that is projected simulates an object of greater size than the actual size of the subject of the image, the object of greater size appearing to the viewer to be situated on a second side of the architectural structure opposite to the first side where the viewer is situated. In some embodiments, in addition to the image appearing to the viewer on the first side, a second object of greater size appears to a second viewer situated on the second side of the architectural structure, the second object appearing to the second viewer to be situated on the first side of the architectural structure.

In some embodiments, the step of utilizing as a display surface a region of an architectural structure comprises providing within the region of the architectural structure a projection material comprising a surface configured to display an image when illuminated.

In some embodiments, the step of projecting at least a portion of an image on the display surface comprises masking an image for projection so that a selected portion of the image for projection is projected on the display surface. In some embodiments, the step of masking an image for projection so that a selected portion of the image for projection is projected on the display surface comprises using a mechanical mask. In some embodiments, the step of masking an image for projection so that a selected portion of the image for projection is projected on the display surface comprises using a digital image and a digital mask.

In some embodiments, the step of utilizing as a display surface a region of an architectural structure comprises utilizing a plurality of regions of an architectural structure as display surfaces. In some embodiments, the step of projecting at least a portion of an image on the display surface comprises projecting a plurality of portions of the image, each portion being projected upon a corresponding region of the plurality of regions of the architectural structure. In some embodiments, the step of utilizing a plurality of regions of an architectural structure as display surfaces comprises providing a projection material comprising a surface configured to display an image when illuminated within at least one of the plurality of regions of an architectural structure as display surfaces. In some embodiments, the step of utilizing a plurality of regions of an architectural structure as display surfaces comprises masking an image for projection so that selected portions of the image for projection are projected upon corresponding regions of the plurality of regions of the architectural structure. In some embodiments, the step of masking an image for projection so that selected portions of the image for projection are projected upon corresponding regions of the plurality of regions of the architectural structure comprises using a mechanical mask. In some embodiments, the step of masking an image for projection so that selected portions of the image for projection are projected upon corresponding regions of the plurality of regions of the architectural structure comprises using a digital image and a digital mask.

In some embodiments, the step of projecting at least a portion of an image on the display surface comprises projecting at least a portion of a still image on the display surface.

In some embodiments, the step of projecting at least a portion of an image on the display surface comprises projecting at least a portion of a moving image on the display surface.

In some embodiments, the step of projecting at least a portion of an image on the display surface comprises projecting at least a portion of a prerecorded image on the display surface.

In some embodiments, the step of projecting at least a portion of an image on the display surface comprises projecting at least a portion of a live image on the display surface.

In some embodiments, the method further comprises the step of providing an audible signal in conjunction with the step of projecting at least a portion of an image on the display surface. In some embodiments, the step of providing an audible signal in conjunction with the step of projecting at least a portion of an image on the display surface comprises providing the audible signal using a loudspeaker.

In another aspect, the invention features a system for generating a visual display visible on a region of an architectural structure utilized as a display surface. The system comprises a projector for projecting at least a portion of an image on the display surface, the at least a portion of the image representing a portion of a magnified image relative to an actual size of a subject of the image. The at least a portion of the image that is projected simulates an object of greater size than the actual size of the subject of the image, the object of greater size appearing to a viewer situated on a first side of the architectural to be situated on a second side of the architectural structure opposite to the first side. In some embodiments, the system further comprises a mask for masking an image for projection so that a selected portion of the image for projection is projected on the display surface. In some embodiments, the system further comprises an audible signal generator for providing an audible signal.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The invention provides systems and methods for simulating the presence of a visual image that appears to be on an opposite side of an architectural structure from a viewer thereof. In other words, by application of the methods and systems of the invention, the viewer sees an image that appears to represent an object situated on the opposite side of the architectural structure, such as an image which is passing behind the architectural structure and is viewed in a window therein, or an object that appears to be viewed in a window in a surface that is in fact an opaque surface. In some embodiments, the methods and systems of the invention provide a method that allows at least two viewers, one viewer situated on a first side of the architectural structure and the other viewer situated on the opposite side of the architectural structure, each to view an image that appears to each viewer to be situated on the side of the architectural structure opposite to the side where the viewer is situated. In the latter circumstance, the two viewers can view the image simultaneously, because the image is being projected upon one or more transparent or translucent surfaces, each of which appears to each viewer as a window through which the image is seen. The visual image can be accompanied by audible signals, such as voice, music, sounds representing natural phenomena such as wind, flowing water, rain or other sounds, as well as sounds that are synthetic. Either or both of the visual images and audible signals can be produced contemporaneously, or can be reproductions of previously recorded images and sounds, recorded on machine-readable storage media.

Figure 1:
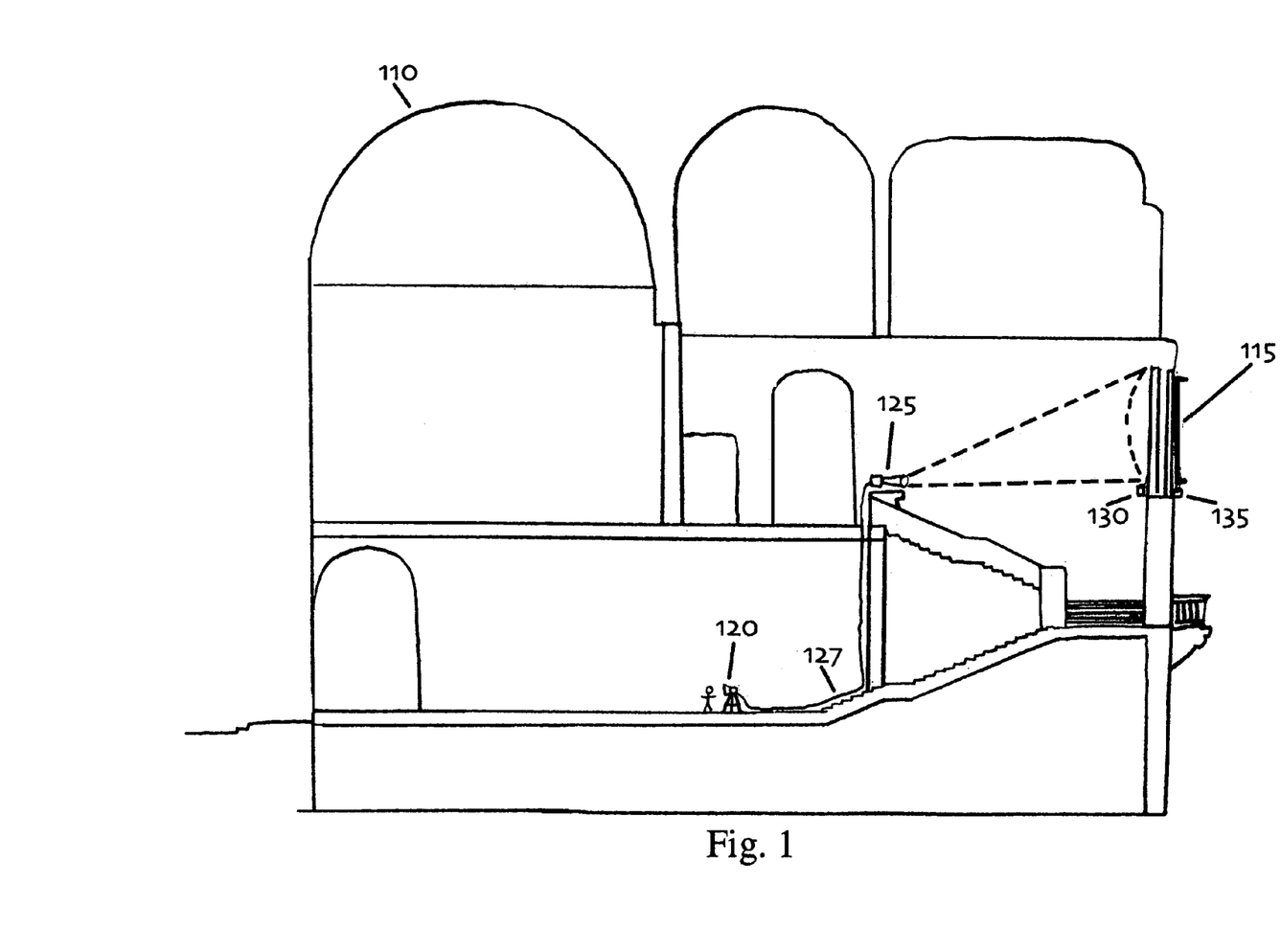
FIG. 1 is a cross sectional drawing showing an architectural structure having at least one region used as a display surface, with a diagrammatic illustrative drawing of a display apparatus situated therein, according to principles of the invention.

Turning to FIG. 1, there is shown diagrammatically in cross section a venue for application of the methods and systems of the invention. Architectural structure 110 is a building having one or more windows or other regions that serve as display surfaces 1115. The display region or regions 115 can be any of an opaque surface such as a wall or a section thereof, a transparent surface such as a pane of window glass, or a translucent surface, such as a frosted glass. In the absence of a transparent, translucent or opaque material present in the regions of interest (e.g., if one or more of the intended display surfaces are open), a surface can be provided, using a sheet of material such as mylar, cloth, paper, or any other convenient material suitable for having an image projected thereon. The apparatus shown in FIG. 1 includes a camera 120, such as an electronic camera configured to record still or moving images, such as a video camera or an electronic single lens reflex camera. Standard film cameras or instant photography cameras can also be used, for example, to take slides of the object to be displayed. If prerecorded images are to be employed in place of, or in addition to, live images, a memory containing one or more prerecorded images is provided, for example using a recording medium such as an electronic memory, such as a flash memory, or an optical memory such as a CD-ROM or DVD, or using images recorded on slides or on projection movie film, and an associated apparatus for reproducing the recorded image. In principle, any image source, including synthetic images, such as hand drawn images, or digital images created in a computer, can be used as the source of the image to be projected using the systems and methods of the invention. The images employed can include one or more still images, one or more moving images, and combinations thereof. In principle, it is possible to mix (e.g., to add or to subtract, or otherwise to combine) two or more images prior to masking the combined images and illuminating the architectural structure with a single source representing the combination of two (or more) images. Alternatively, a plurality of images can be used to illuminate one or more regions by providing a plurality of video display units, each with its own mask as required to provide illumination in one or more regions of interest and not elsewhere, and operating the plurality of video display units in concert. In the embodiment of FIG. 1, a recording system such as an SD card is present in the camera 120, although those of ordinary skill will recognize that the camera 120 can be replaced with a memory and an image reproducing device.

The image signal generated by the camera 120 is an image of a subject, such as a person, that is intended to be displayed. In the embodiment shown, the camera 120 records an image of a head and torso of a person, for display on the one or more display regions 115. The person may look into he camera in a "straight-on" aspect, or may look into the camera in an inclined aspect (e.g., looking down on the upward pointing camera), or some other physical relationship between the object and the camera can be employed. If the intention is to display a giant face looking downward at the viewer, having the person being photographed look in a downward direction at an upwardly turned camera can heighten the realism of the illusion. In general, the image of the object (here, a person) that is displayed is larger than the actual size of the object (or the person).

Figure 4:
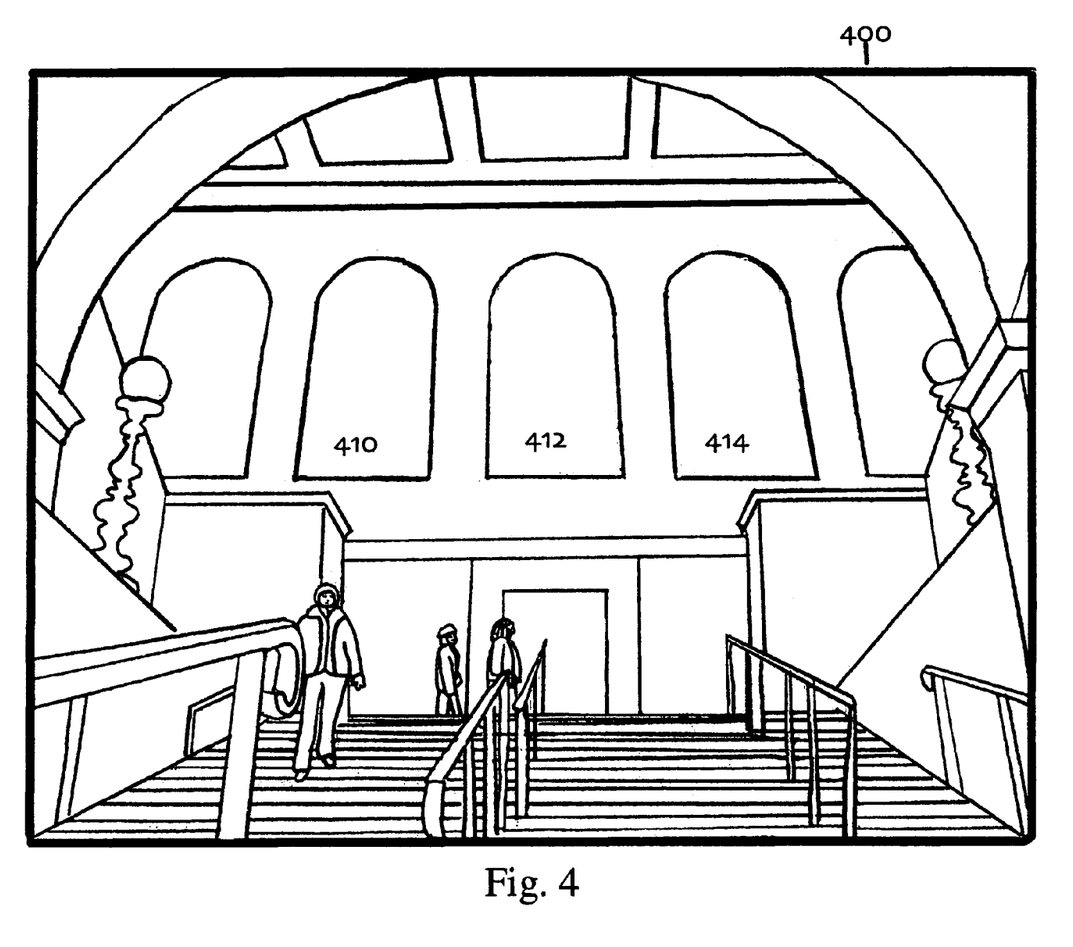
FIG. 4 is an illustration of a mask, according to principles of the invention.

The system also includes a display device 125, such as a video projector. In the embodiment shown, the camera 120 is connected to the display device 125 by a cable 127 for displaying a "live feed" or substantially real time image. The video projector is any convenient projector, and can be a selected one of an analog projector and a digital projector. In order to conform the illumination representing the object (or person) to be displayed to the display region (and to avoid illuminating the architectural structure where no image is intended to appear), the image for display is cropped or masked to match the display region in shape and size. FIG. 4, which is described in greater detail hereinafter, is an example of a mask 400.

The mask can be a mechanical mask, such as a sheet of opaque material having one or more interstices therein, through which illumination can pass, and which has opaque portions to intercept those portions of the illumination representing sections of an image that are not to be displayed. Alternatively, in the case of a digital image and a digital display device, the mask can be a digital mask, whereby selected portions of the image for display are left unchanged, and other portions of the image, which correspond to portions of the image that are not to be displayed, are masked to an "off" condition, e.g., are mathematically manipulated with a value that causes the digital projector to display "black" (or to fail to illuminate) at the locations of the image that are not to be displayed. For example, for a digital display wherein the format of the digital display signal for "black" is zero, the system can define a digital value of zero as the value of a digital display signal at a location where no illumination is required, and can use the existing digital value as the value of a digital display signal at a location where illumination is required. The video projector is used to project the desired image segment or segments onto the corresponding region or regions of the display surface.

Speakers 130, 135 situated on each side of the architectural structure can be employed to provide the same audible signal to a viewer on either side of the architectural structure. The speakers are connected in a conventional manner to the display apparatus 125, which can comprise an audio output as needed. The speakers can be connected to the audio source by wire, or can be connected by a wireless electromagnetic connection. The audio source can provide live sound or prerecorded sound as may be appropriate.

A viewer viewing the display surface sees an image that appears to be "behind" the architectural structure, or on the side of the architectural structure opposite to that of the viewer. It is believed that the image is so seen because the viewer recognizes the one or more sections of the image displayed in the one or more corresponding regions as a part (or multiple parts) of a larger whole image, such as a person's head and torso, and because there is no illumination impinging upon the architectural structure outside the display region (the excess illumination having been masked off or cropped), the viewer forms the mental impression that the missing portions are "hidden" by the architectural structure, and therefore, the viewer concludes that the object depicted in the image "must" be on the other side of the architectural structure. For moving images, all of the displayed segments move in unison, because the moving image is masked in real time, thereby providing the illusion that the object "behind" the architectural structure is moving. For analog masks, e.g., one or more cutouts in an opaque sheet, the masking is instantaneous. For digital masking, the masking need only be faster than approximately 16 frames per second, which is the threshold for human visual perception of motion. By comparison, television images are refreshed 30 times per second, and movie film is projected at about 24 frames per second. Such masking is well within the capability of modern digital optical systems, and can easily be accomplished using conventional computer technology, for example using a general purpose personal computer, such as personal computers available from Apple Computer or from any of the many manufacturers of Windows™/Intel™ (colloquially known as "wintel") computers.

Those of ordinary skill will recognize that many different kinds of architectural structures can be employed. Examples of architectural structures that can be employed in carrying out the methods of the invention include buildings with windows, structures with openings wherein an opening is covered with a transparent or translucent sheet, such as a bridge or other latticework having one or more interstices, and structures having one or more "window-like" opaque regions upon which an image segment can be cast as illumination, and combinations thereof. As will become apparent, the method can be employed on the inside or the outside of a building, and on outdoor structures such as a suitably designed billboard, on a bridge, on the sails of a sailing vessel, on a tent, or on other structures. In some instances, the systems and methods of the invention can be employed on one or more surfaces having non-planar characteristics, such as a corner or a region where two flat surfaces join at an angle, such as a wall-ceiling junction. A first embodiment of a method and system of the invention, using an architectural structure comprising a building having windows, is depicted in FIGS. 2 and 3.

Figure 2:
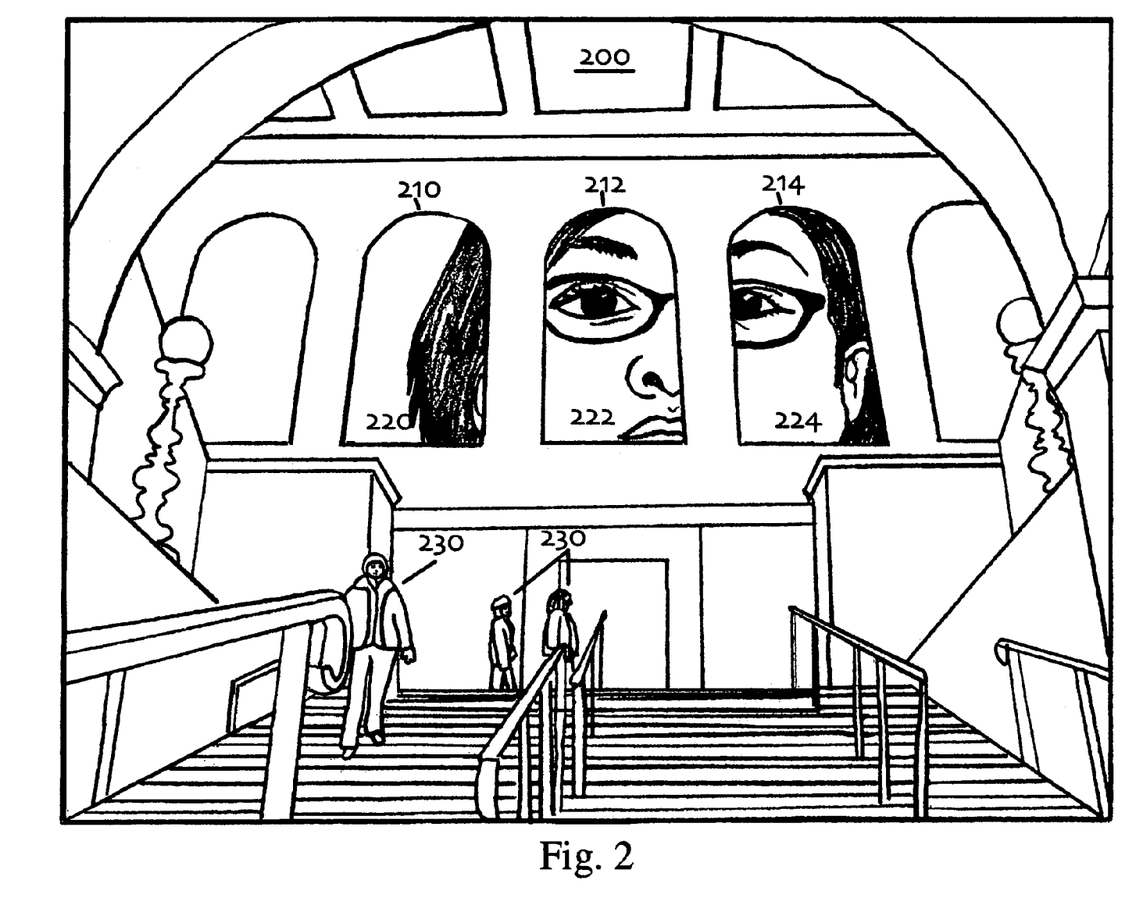
FIG. 2 is an illustration of an exemplary embodiment of a first display of the systems and methods of the invention.

FIG. 2 is an illustration of a first display of an image upon an architectural structure 200 as seen from an internal location thereof. A display area is present comprising three regions or segments 210, 212, 214. Each region 210, 212, 214 has three linear sides forming a substantially rectangular outline, and each region is terminated at one end in a semi-circular curve. There is seen within each of the three regions 210, 212, 214 a portion 220, 222, 224 of a face of a person wearing eyeglasses. Several persons 230 are shown standing at the top of a stairway situated below the regions 210, 212, 214, and can be compared in size to the image portions 220, 222, 224. As may be seen, the image appearing in the three regions 210, 212, 214 is significantly larger than any of the persons shown (e.g., the image is a giant image). The image gives the appearance that a giant person is looking toward the viewer from behind the wall in which the three display regions 210, 212, 214 are situated (that is, the giant image appears to be looking into the architectural structure 200).

Figure 3:
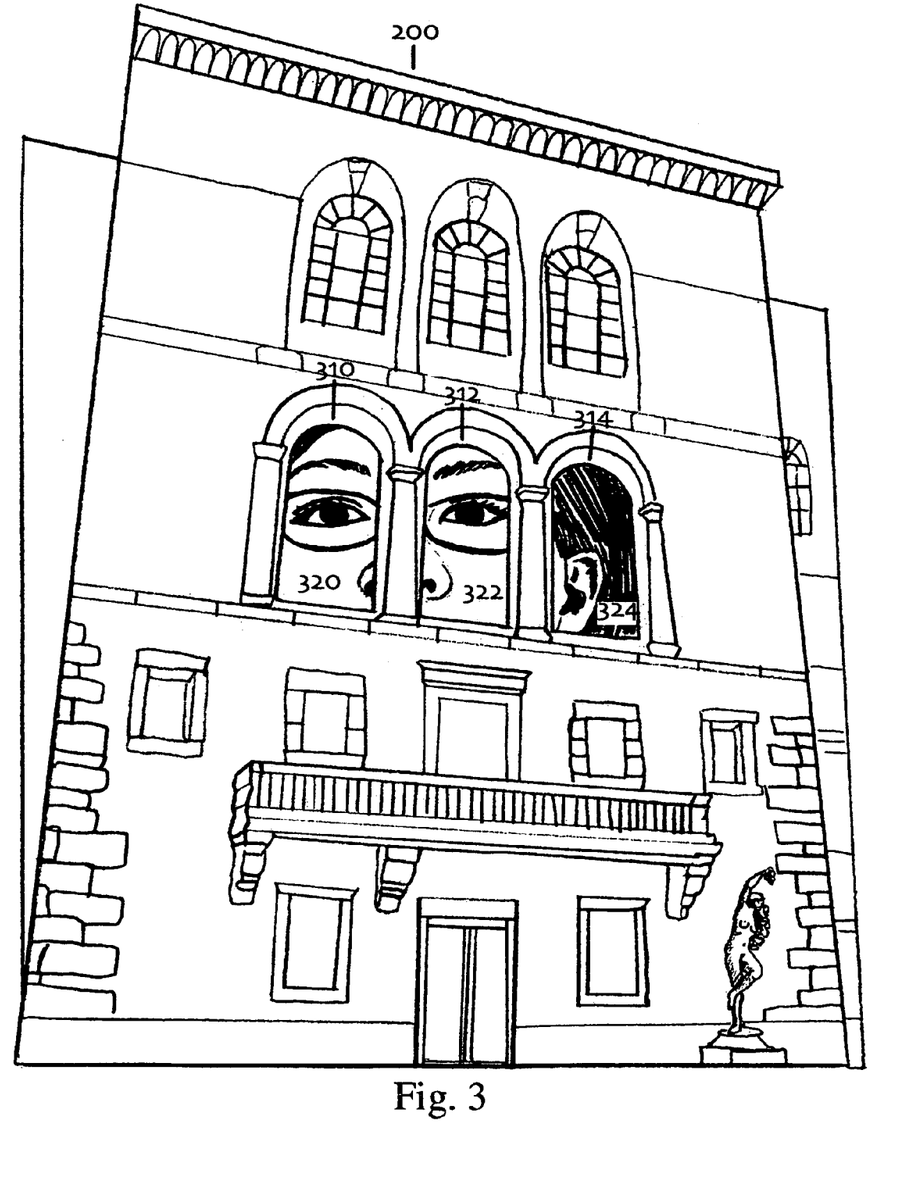
FIG. 3 is an illustration of an exemplary embodiment of a second display of the systems and methods of the invention.

FIG. 3 is another illustration of a view of the giant image of FIG. 2 (that is, an image of the same person), as viewed from outside the architectural structure 200 of FIG. 2. Again, three display regions 310, 312, 314 are shown, in which three segments of an image 320, 322, 324 appear. The three display regions 310, 312, 314 are seen to be rectangular windows, each capped with a semi-circular light, which correspond substantially in overall dimensions to the display regions 210, 212, 214 of FIG. 2. In FIG. 3, the giant image again appears to be looking at the viewer, but now in an outward direction relative to the architectural structure 200. As will be understood, two viewers, one situated within the architectural structure 200, and one situated outside the architectural structure 200, each see the same giant image as being situated on the opposite side of the architectural structure 200 from the viewer. The images seen by the two viewers are related as mirror images. Each viewer can see the giant image simultaneously with the other viewer. Speakers situated on each side of the architectural structure 200 can be employed to provide the same audible signal to each viewer. One can compare other features of FIGS. 2 and 3, such as the doorway beneath the central region of each display region, to note that FIGS. 2 and 3 represent views from opposite sides of the same architectural structure, a wall having a plurality of windows defined therein.

FIG. 4 is an illustration of a mask 400, which is one embodiment of a mechanical mask useful for defining the illumination regions of the image to be displayed. The mask 400 has three regions 410, 412, 414 through which illumination will pass, which regions are cut-outs defined within the plane of mask 400. The mask 400 may be conveniently produced by taking a photograph of the region or regions of the display surface to be used from the vantage point where the display apparatus 125 is to be situated, and then removing from the photograph those portions though which illumination is intended to be allowed to pass. Using photographic methods, such as enlargement and lithographic methods, a mask can be produced having suitable size and having the necessary apertures in the correct relationships. Alternatively, a mask can be made by assembling one or more appropriately designed apertures in the correct relative position and orientation. Equally, one can make a digital mask in a similar manner, by capturing a digital image and defining a digital mask having the correct values in the required regions. In any event, mask making is a well known art in the photographic and lithographic arts, and any convenient method of making a mask that provides illumination in the regions where illumination is required, and that prevents illumination from reaching the architectural structure 200 in the regions where illumination is not required, is satisfactory. Lighting masks called "gobos" are known.

Figure 5:
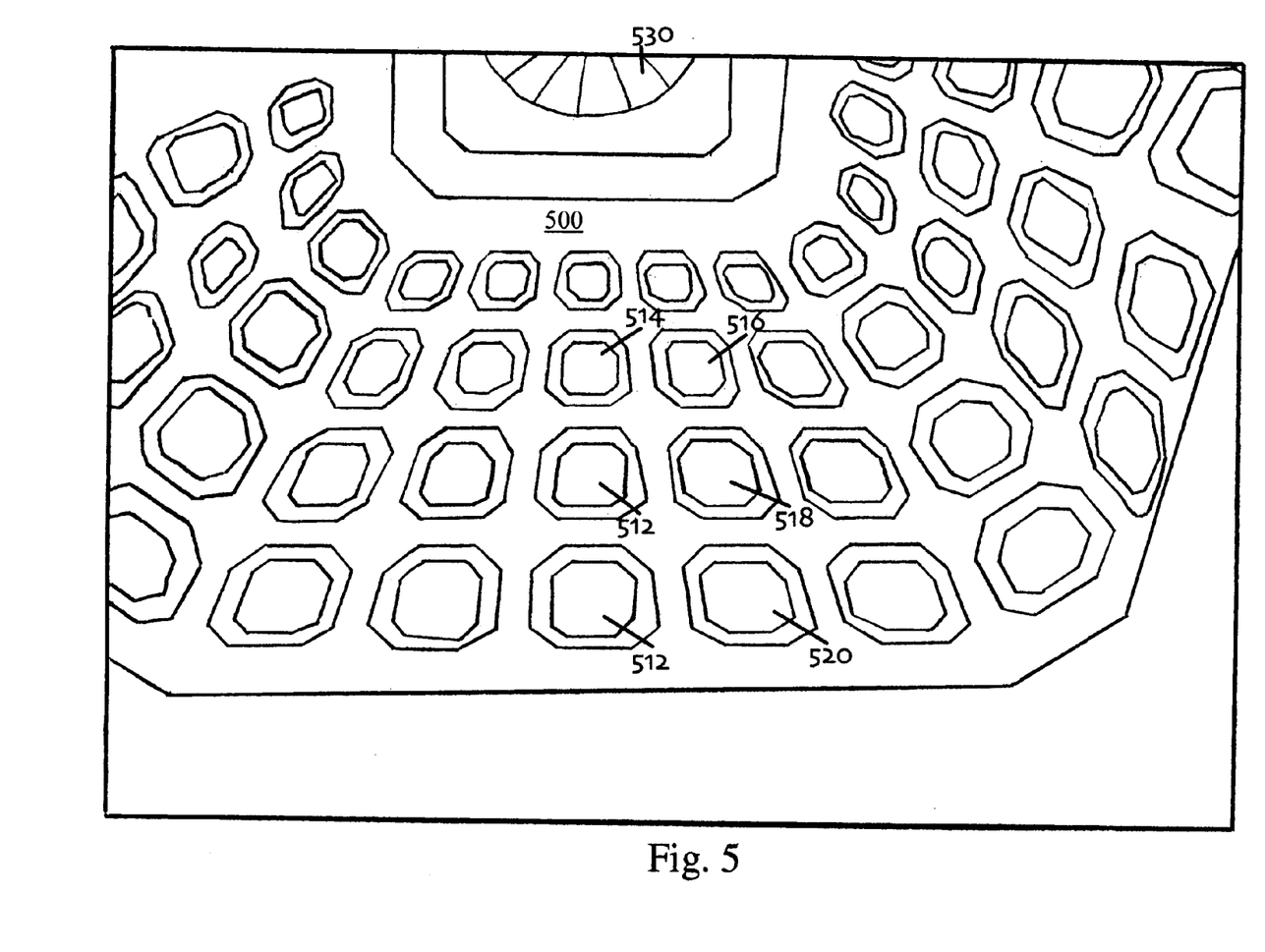
FIG. 5 is an illustration of a second architectural structure having a plurality of regions used as display surfaces, according to principles of the invention.

FIG. 5 is an illustration of a second architectural structure 500 having a plurality of regions 510, 512, 514, 516, 518, 520 used as display surfaces. In FIG. 5, the architectural structure 500 is a dome-like structure that is substantially opaque so that an image cast upon one or more of the regions 510, 512, 514, 516, 518, 520 is visible from only one side. A skylight 530 is visible at the top of FIG. 5, corresponding to the center of the dome structure.

Figure 6:
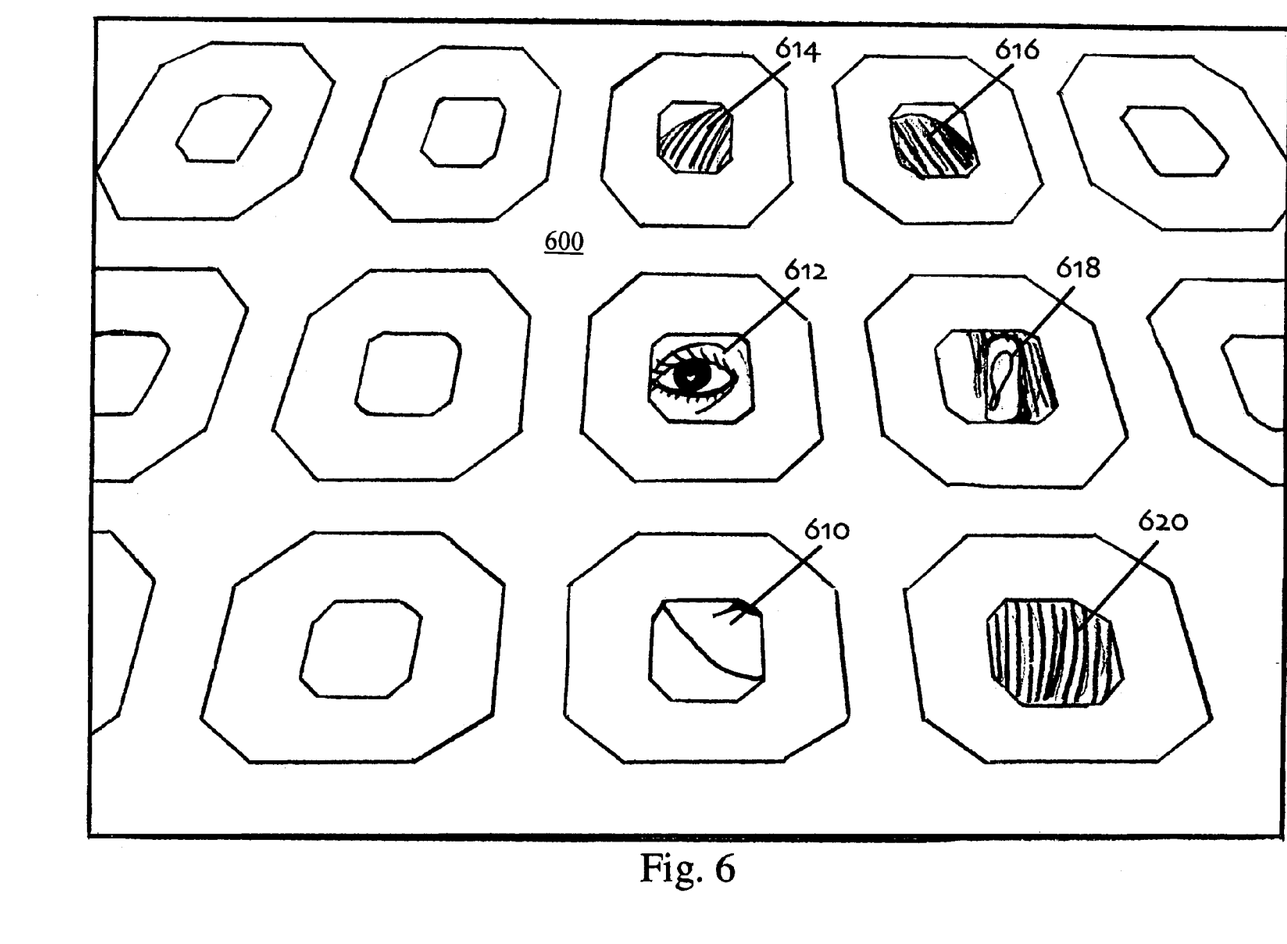
FIG. 6 is an illustration of an exemplary embodiment of a third display of the systems and methods of the invention.

FIG. 6 is an illustration of an exemplary embodiment of a third display 600, employing a plurality of regions 610, 612, 614, 616, 618, 620, corresponding to the plurality of regions 510, 512, 514, 516, 518, 520 of FIG. 5. As may be seen in FIG. 6, the image segments displayed in the regions 610, 612, 614, 616, 618, 620 appear to the viewer to represent a giant face looking at the viewer from behind the dome. Note in particular the eye in region 612 and the hair in regions 614 and 616. Other portions of a human face and head appear in regions 610, 618, and 620.

Figure 7A:
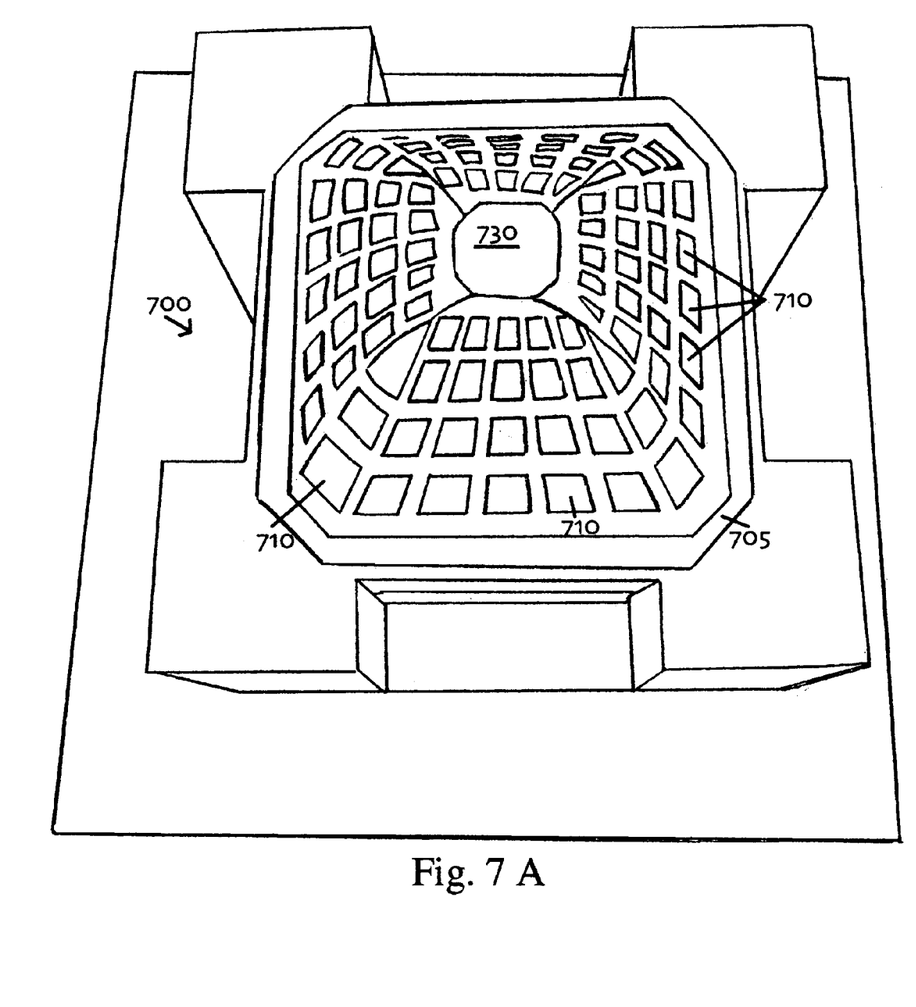
FIGS. 7A and 7B are illustrations of an exemplary mask useful for generating images in conjunction with the architectural structure of FIG. 5, according to principles of the invention.
Figure 7B:
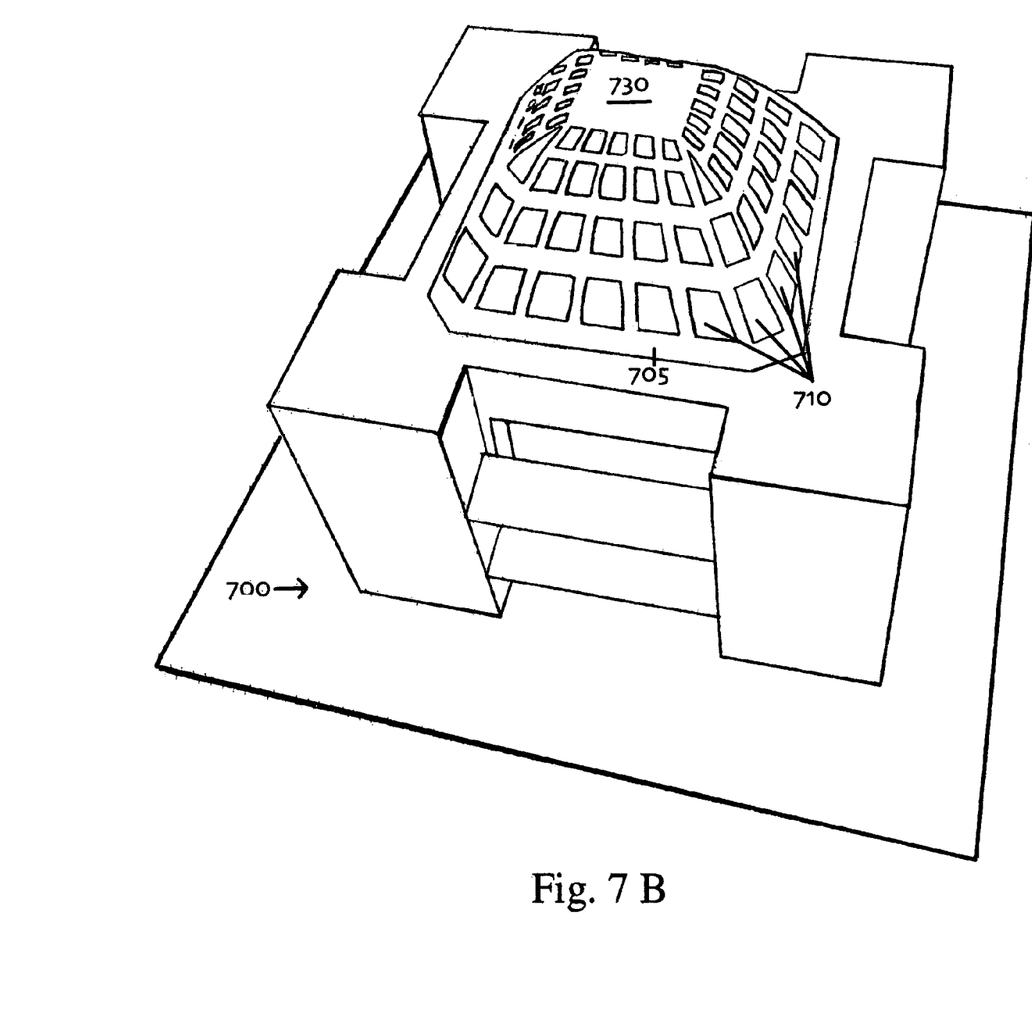

FIGS. 7A and 7B are illustrations of an exemplary mask 700 useful for generating images in conjunction with the architectural structure of the dome 500 of FIG. 5. FIGS. 7A and 7B show two perspective views of a mask 700 comprising a three dimensional model 705 of the dome structure 500 of FIG. 5, wherein a plurality of apertures, generally 710, is defined within the structure. The structure shown is a paperboard model of the dome of FIG. 5, wherein the display regions are defined by the apertures 710 and the paperboard serves to mask the regions where no illumination is desired. For example, the mask prevents illumination from reaching the skylight 530 of FIG. 5 by providing an opaque surface 730 corresponding to the projected location of the skylight, when viewed from beneath the mask 700, for example from a location substantially in the center of the mask structure corresponding to a point on the floor of the architectural structure beneath the center of the actual dome. Equivalently, having generated the three dimensional structure of FIGS. 7A and 7B, one could produce a mask by photographing either the dome itself, or the three dimensional mask structure 700, and generating a two dimensional mask therefrom, using the same principles as those used in making the mask 400 of FIG. 4. Alternatively, it is in principle possible to construct a mathematical model of the dome and to generate therefrom a digital mask for illuminating selected regions and for preventing illumination from reaching other selected regions.

Machine-readable storage media that can be used in the invention include electronic, magnetic and/or optical storage media, such as magnetic floppy disks and hard disks, a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and such machine-readable symbols as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. A method of generating a visual display, comprising the steps of:
   utilizing as a display surface a region of an architectural structure, said region being visible to a viewer, said viewer being situated on a first side of said architectural structure;
   projecting at least a portion of an image on said display surface; and
   simulating with at least a portion of said image that is projected an object of greater size than an actual size of said subject of said image, said simulated object of greater size appearing to the viewer to be situated on a second side of said architectural structure opposite to said first side where the viewer is situated.

2. The method of generating a visual display of claim 1, whereby, in addition to the simulated object appearing to said viewer on said first side, a second simulated object of greater size appears to a second viewer situated on said second side of said architectural structure, said second simulated object appearing to said second viewer to be situated on said first side of said architectural structure.

3. The method of generating a visual display of claim 1, wherein the step of utilizing as a display surface a region of an architectural structure comprises providing within said region of said architectural structure a projection material comprising a surface configured to display an image when illuminated.

4. The method of generating a visual display of claim 1, wherein the step of projecting at least a portion of an image on said display surface comprises masking an image for projection so that a selected portion of said image for projection is projected on said display surface.

5. The method of generating a visual display of claim 4, wherein the step of masking an image for projection so that a selected portion of said image for projection is projected on said display surface comprises using a mechanical mask.

6. The method of generating a visual display of claim 4, wherein the step of masking an image for projection so that a selected portion of said image for projection is projected on said display surface comprises using a digital image and a digital mask.

7. The method of generating a visual display of claim 1, wherein the step of utilizing as a display surface a region of an architectural structure comprises utilizing a plurality of regions of an architectural structure as display surfaces.

8. The method of generating a visual display of claim 7, wherein the step of projecting at least a portion of an image on said display surface comprises projecting a plurality of portions of said image, each portion being projected upon a corresponding region of said plurality of regions of said architectural structure.

9. The method of generating a visual display of claim 7, wherein the step of utilizing a plurality of regions of an architectural structure as display surfaces comprises providing a projection material comprising a surface configured to display an image when illuminated within at least one of said plurality of regions of an architectural structure as display surfaces.

10. The method of generating a visual display of claim 7, wherein the step of utilizing a plurality of regions of an architectural structure as display surfaces comprises masking an image for projection so that selected portions of said image for projection are projected upon corresponding regions of said plurality of regions of said architectural structure.

11. The method of generating a visual display of claim 10, wherein the step of masking an image for projection so that selected portions of said image for projection are projected upon corresponding regions of said plurality of regions of said architectural structure comprises using a mechanical mask.

12. The method of generating a visual display of claim 10, wherein the step of masking an image for projection so that selected portions of said image for projection are projected upon corresponding regions of said plurality of regions of said architectural structure comprises using a digital image and a digital mask.

13. The method of generating a visual display of claim 1, wherein the step of projecting at least a portion of an image on said display surface comprises projecting at least a portion of a still image on said display surface.

14. The method of generating a visual display of claim 1, wherein the step of projecting at least a portion of an image on said display surface comprises projecting at least a portion of a moving image on said display surface.

15. The method of generating a visual display of claim 1, wherein the step of projecting at least a portion of an image on said display surface comprises projecting at least a portion of a prerecorded image on said display surface.

16. The method of generating a visual display of claim 1, wherein the step of projecting at least a portion of an image on said display surface comprises projecting at least a portion of a live image on said display surface.

17. The method of generating a visual display of claim 1, further comprising the step of providing an audible signal in conjunction with the step of projecting at least a portion of an image on said display surface.

18. The method of generating a visual display of claim 17, wherein the step of providing an audible signal in conjunction with the step of projecting at least a portion of an image on said display surface comprises providing said audible signal using a loudspeaker.

19. A system for generating a visual display visible on a region of an architectural structure utilized as a display surface, comprising:
   a projector for projecting at least a portion of an image on said display surface;
   said at least a portion of said image that is projected simulates an object of greater size than an actual size of said subject of said image; and
   said simulated object of greater size appears to a viewer situated on a first side of said architectural structure to be situated on a second side of said architectural structure opposite to said first side.

20. The system for generating a visual display visible on a region of an architectural structure utilized as a display surface of claim 19, further comprising a mask for masking an image for projection so that a selected portion of said image for projection is projected on said display surface.

21. The system for generating a visual display visible on a region of an architectural structure utilized as a display surface of claim 19, further comprising an audible signal generator for providing an audible signal.

* * * * *